United States Patent [19]

Kunishi

[11] Patent Number: 5,790,918
[45] Date of Patent: Aug. 4, 1998

[54] IMAGE FORMING APPARATUS AND RELATED METHOD OF IMAGE FORMING

[75] Inventor: Tsuyoshi Kunishi, Yokohama, Japan

[73] Assignee: Canon Kabushiki Kaisha, Japan

[21] Appl. No.: 604,394

[22] Filed: Feb. 21, 1996

[30] Foreign Application Priority Data

Feb. 24, 1995 [JP] Japan ................. 7-037245

[51] Int. Cl.$^6$ .................................................. G03G 15/08
[52] U.S. Cl. .................................................. 399/29
[58] Field of Search ..................... 399/4, 27, 29, 399/30

[56] References Cited

U.S. PATENT DOCUMENTS

| | | | |
|---|---|---|---|
| 4,963,927 | 10/1990 | Ishihara | 399/29 |
| 4,970,599 | 11/1990 | Nobuta | 358/437 X |
| 5,099,293 | 3/1992 | Kawai | 355/326 |
| 5,266,996 | 11/1993 | Wakamiya et al. | 399/4 |
| 5,440,408 | 8/1995 | Tomita | 358/468 |

FOREIGN PATENT DOCUMENTS

| | | |
|---|---|---|
| 61-29271 | 2/1986 | Japan . |
| 6-62164 | 3/1994 | Japan . |
| 7-38681 | 2/1995 | Japan . |
| 2217261 | 10/1989 | United Kingdom . |

*Primary Examiner*—Fred L. Braun
*Attorney, Agent, or Firm*—Fitzpatrick, Cella, Harper & Scinto

[57] ABSTRACT

In an image forming apparatus, and related method of forming an image, having a copy function, a printer function, and a facsimile function, when the absence of the toner is detected, a copy or a data print from a computer is inhibited but a recording of an image which was facsimile received is permitted. Thus, a situation such that the facsimile reception cannot be performed due to the absence of the toner at night or the like is prevented.

17 Claims, 5 Drawing Sheets

IMAGE FORMING APPARATUS AND RELATED METHOD OF IMAGE FORMING

BACKGROUND OF THE INVENTION

1. Field of the Invention

The invention relates to an image forming apparatus for forming an image by using a visualizing agent such as toner, ink, or the like.

2. Related Background Art

Recently, an image forming apparatus having functions of a copy, a facsimile, and a printer in one device has been proposed.

In such a kind of image forming apparatus, an image corresponding to an image signal of a facsimile which is transmitted from a remote location through a telephone line or images corresponding to a plurality of kinds of image signals which are sent from an image reading device, a computer, and the like arranged around the image forming apparatus are formed onto a transfer material by a visualizing agent such as toner, ink, or the like.

In such an image forming apparatus for forming the images corresponding to the image signals from a plurality of kinds of devices onto the transfer material by the visualizing agent such as toner, ink, or the like, in case of using an electrophotography system as visualizing means, an electrostatic latent image formed on the uniformly charged surface of the image holding member by a laser scanner, an LED array, or the like for emitting a light in response to the image signal is developed to a toner image by a developing device, the toner image is transferred and fixed onto a transfer material, and is outputted as a visualized image. Each time the image formation is executed, the toner in the developing device is consumed and reduced. When a remaining amount of the toner in the developing device is equal to 0, even if the image formation is executed, only a blank paper is outputted and no visualized image is derived. To avoid such a situation, in the conventional image forming apparatus, means for detecting the remaining amount of the toner in the developing device is provided and when it is detected that the toner remaining amount in the developing device decreased to a predetermined amount, a message to promote the supply of the toner is displayed and the execution of the image formation is inhibited.

In case of using such an image forming apparatus as a copying apparatus or a printer of a computer, even if the message to promote the supply of the toner is displayed, the operator who is present at a near location can immediately supply the toner.

However, in case of using such an image forming apparatus as a facsimile apparatus, if the toner lacks in the middle of the reception of the images at night when there is no person, the toner is not supplied, so that the subsequent reception is not accepted. Even in a device having a memory to print the received images, so long as a memory capacity lacks, the reception is not similarly accepted as well.

SUMMARY OF THE INVENTION

It is an object of the invention to provide an image forming apparatus and its control method which can eliminate the drawbacks mentioned above.

Another object of the invention is to provide an image forming apparatus and its control method, in which a state such that a facsimile reception in a situation such that a visualizing agent cannot be supplied is not accepted is prevented as much as possible.

Still another object of the invention is to provide an image forming apparatus and its control method, in which a detection level of no visualizing agent is changed in accordance with the kind of input source of image information, thereby preventing as much as possible that the image formation cannot be performed in a situation such that there is no person.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described in detail hereinbelow with reference to the drawings.

Figure 2:
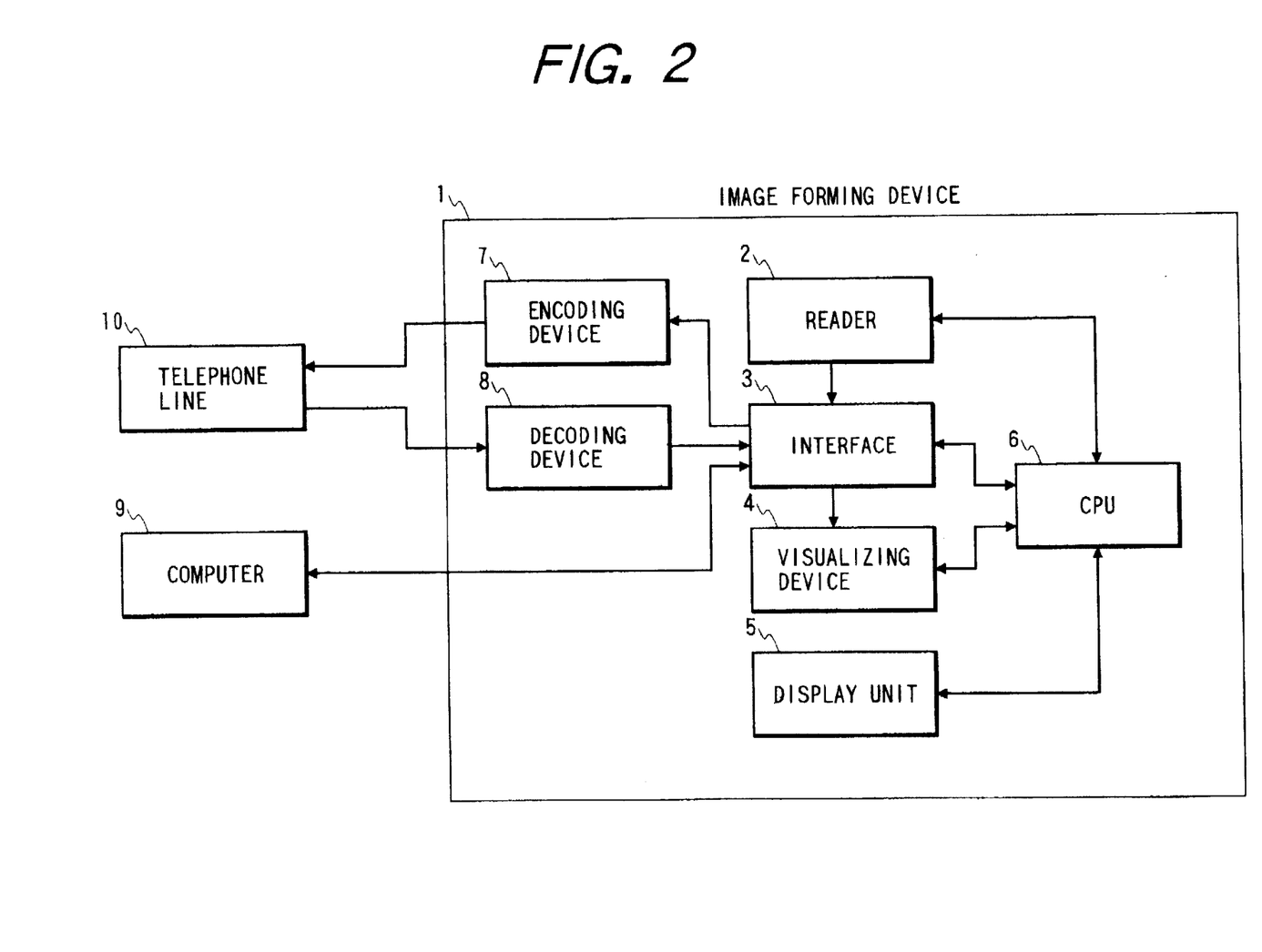
FIG. 2 is a block diagram of an image forming apparatus according to the invention.

FIG. 2 is a block diagram of an image forming apparatus having functions of a facsimile, a printer, and a copying apparatus.

Reference numeral 1 denotes an image forming apparatus having the following component elements 2 to 8. A reception signal of a facsimile from a telephone line 10 is decoded into an image signal of a bit map form by a decoding device 8. After that, the decoded signal passes through an interface 3 and is visualized by a visualizing device 4. An image signal from a computer 9 passes through the interface 3 and is visualized by the visualizing device 4. In case of copying, an image signal from a reader 2 for photoelectrically converting and reading an original image passes through the interface 3 and is visualized by the visualizing device 4.

Figure 1:
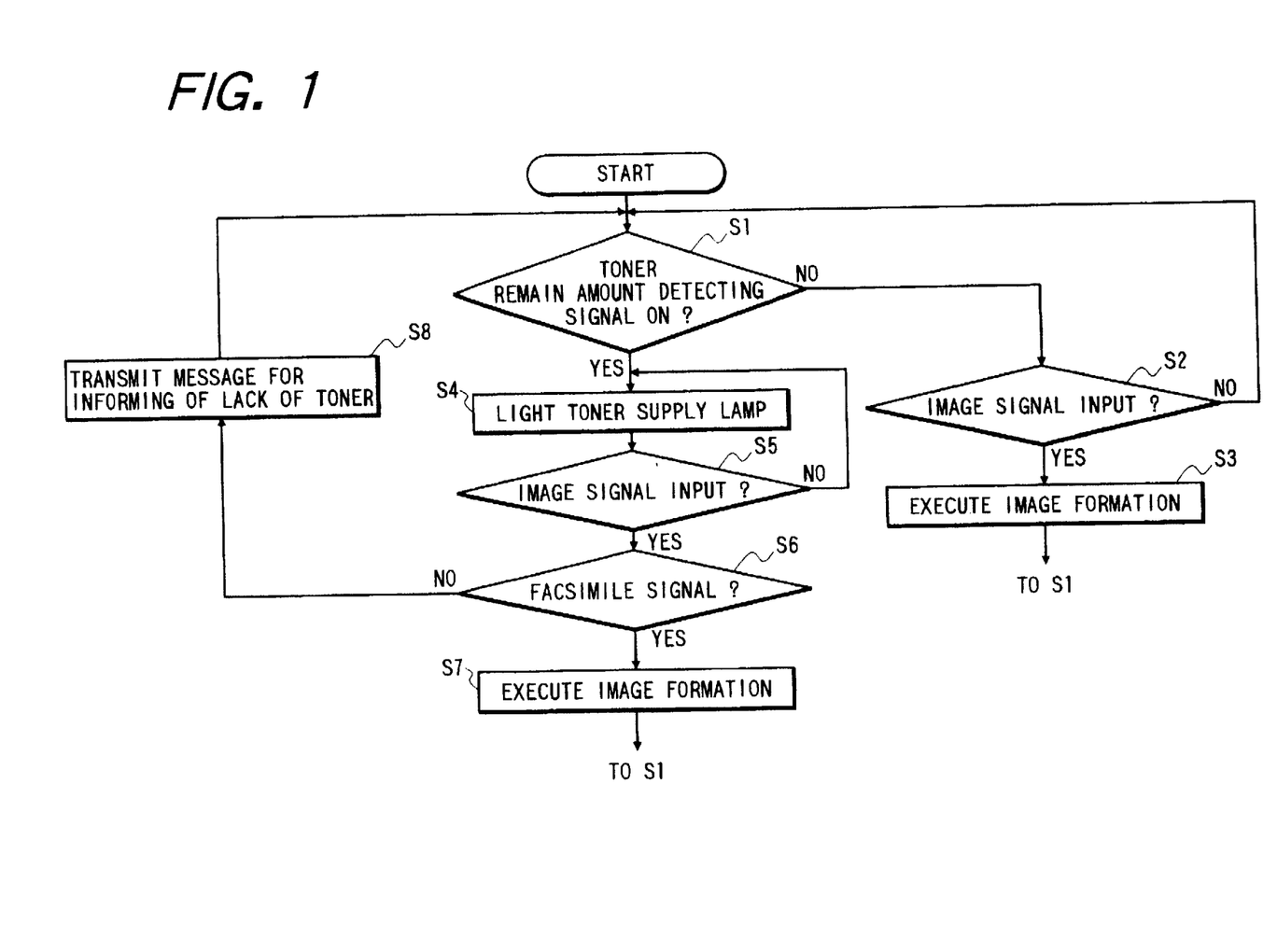
FIG. 1 is a flowchart for the image forming operation in the first embodiment.
Figure 4:
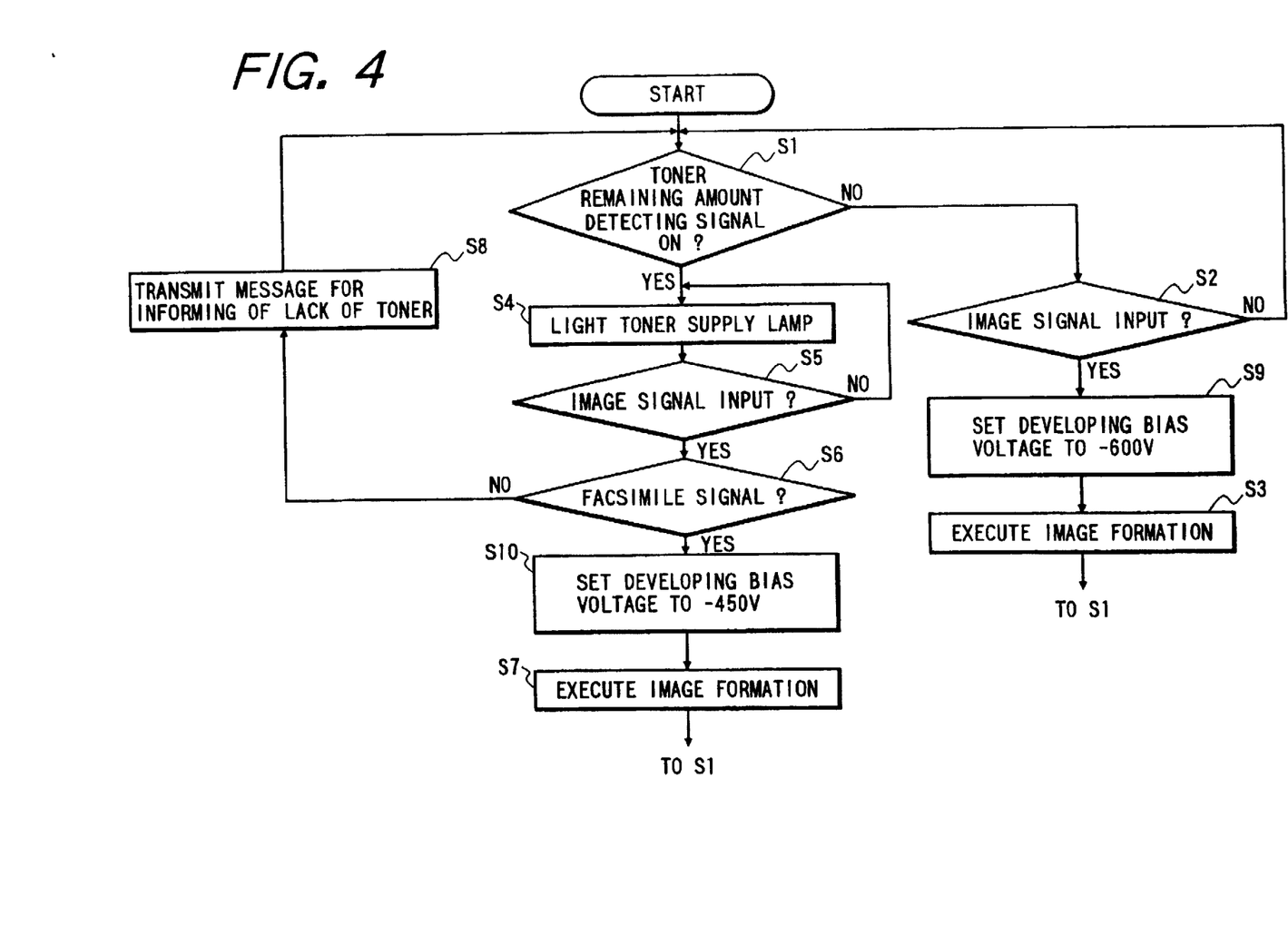
FIG. 4 is a flowchart for the image forming operation in the second embodiment.
Figure 5:
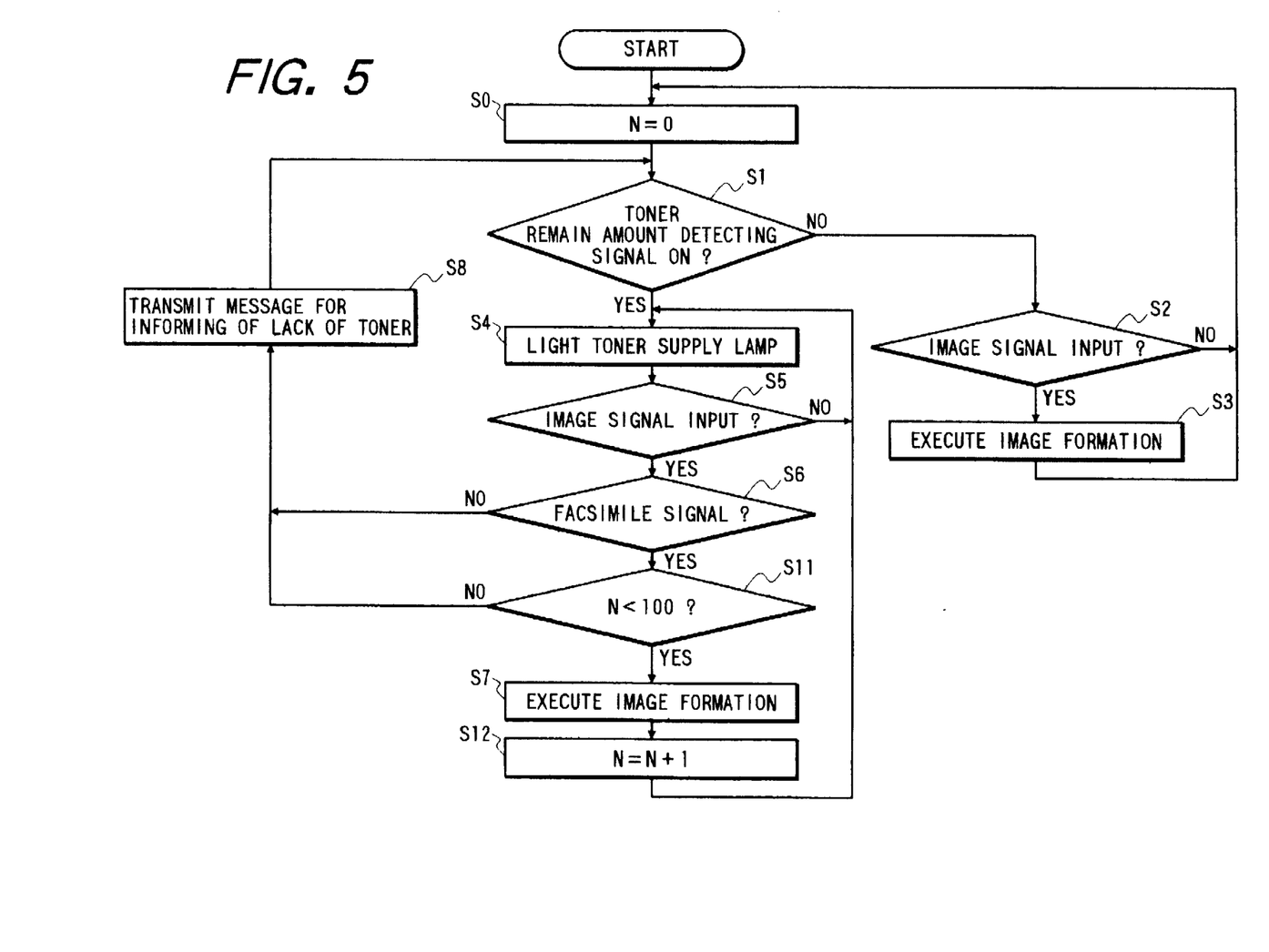
FIG. 5 is a flowchart for the image forming operation in the third embodiment.

The reader 2, interface 3, visualizing device 4, and a display unit 5 are controlled by a CPU 6 by mutually communicating. The CPU 6 includes memory means having an area in which control procedures as shown in FIGS. 1, 4, and 5, which will be explained hereinlater, have been stored and a work area of the CPU 6.

Figure 3:
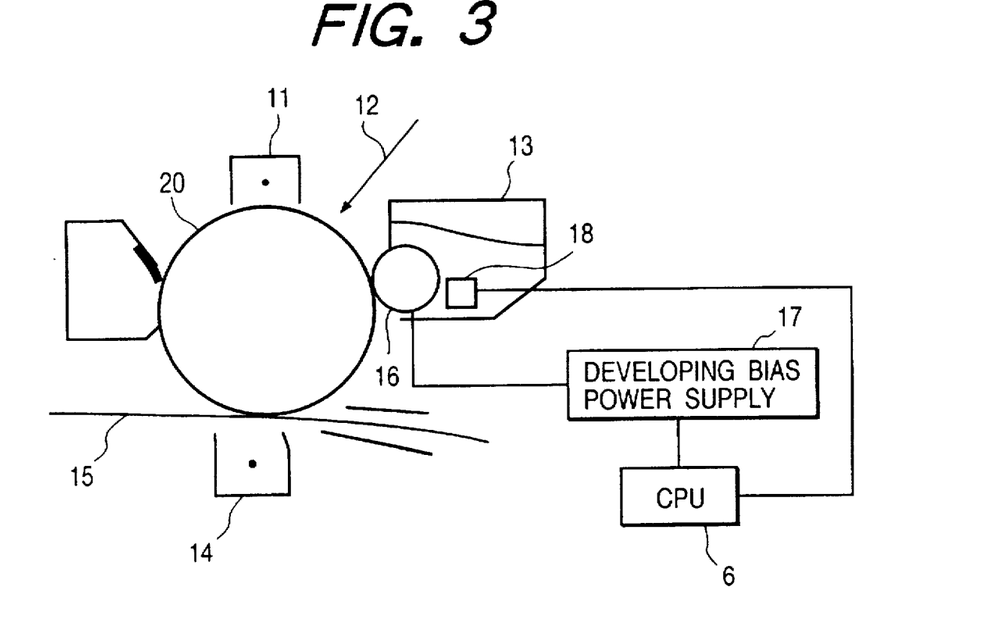
FIG. 3 is a cross sectional view of a main section regarding the visualization.

FIG. 3 is a schematic diagram of a cross section of a main section of the visualizing device 4 in the image forming apparatus 1. By scanning a laser beam 12 for emitting a light in response to the inputted image signal, an electrostatic latent image is formed onto the surface of an image holding member 20 charged uniformly by a primary charging device 11. The electrostatic latent image is developed to a toner image by a developing device 13. The toner image is transferred to a transfer material 15 by a transfer device 14. After that the toner image on the transfer material 15 is fixed onto the transfer material 15 by a fixing device (not shown). In the embodiment, a uniform charged potential on the surface of the image holding member 20 is set to −700 V, a latent image potential corresponding to a blank portion of the image is set to −700 V, and a latent image potential corresponding to a black portion of the image is set to −250 V. The developing device 13 is a device for developing the electrostatic latent image on the surface of the image holding member 20 to the toner image by allowing a developing agent holding member 16 to which a developing bias voltage including a DC component was applied to face the image holding member 20. As a developing system of the developing device 13, an inversion developing system using a toner of a minus polarity is used. A value of the DC component of the developing bias voltage which is supplied from a developing bias power supply 17 to the developing agent holding member (developing sleeve) 16 changes in accordance with a control signal which is sent from the CPU 6.

A toner remaining amount detecting device 18 to detect a remaining amount of the toner is provided in the developing device 13. The toner remaining amount detecting device 18 is constructed by a piezoelectric element or the like and informs the CPU 6 of a judgment result about whether the toner amount in the developing device 13 has decreased to a predetermined amount or not. When the toner remaining amount reaches the predetermined amount, a signal from the toner remaining amount detecting device 18 is set to an ON state.

[First embodiment]

FIG. 1 shows a flowchart for the image forming operation in the first embodiment using the above construction.

After a power source of the image forming apparatus 1 was turned on and the memory and the like were initialized, first in step S1, when the signal which is sent from the toner remaining amount detecting device 18 to the CPU 6 is OFF, namely, when the toner remaining amount in the developing device 13 exceeds the predetermined amount, step S2 follows. In step S2, a check is made to see if the image signal has been inputted. Even in any one of the image signals inputted from the telephone line 10, computer 9, and reader 2, the processing routine advances to step S3. The image formation is executed on the basis of the inputted image signal. The processing routine is returned to step S1.

In step S1, when the signal which is sent from the toner remaining amount detecting device 18 to the CPU 6 is ON, namely, when the toner remaining amount in the developing device 13 is equal to or less than the predetermined amount, a toner supply lamp (not shown) of the display unit 5 is lit on in step S4. In step S5, the device waits for the input of the image signal. When the image signal is inputted, step S6 follows and a check is made to see if the inputted signal is a facsimile signal. Only when the inputted image signal is the facsimile signal from the telephone line 10, the image formation based on the image signal is executed in step S7. The processing routine is returned to step S1. When the inputted image signal is the image signal from the computer 9 in step S6, step S8 follows and the input of the image signal is inhibited. The CPU 6 transmits a message indicating that the image formation is inhibited because of the lack of the toner remaining amount to the computer 9 through the interface 3. The processing routine is returned to step S1. When the inputted image signal is the image signal from the reader 2 in step S6, the input of the image signal is inhibited in step S8. The CPU 6 transmits a message indicating that the image formation is inhibited due to the lack of the toner remaining amount to the display unit 6. The processing routine is returned to step S1. According to the embodiment, after the toner remaining amount detection signal was turned on, the absence of the toner is detected at a level such that about 500 standard originals of 7% can be printed.

According to the embodiment, with respect to only the image signal of the facsimile which was transmitted from the operator at a remote location where the toner cannot be supplied even if the toner remain amount in the developing device decreases to the predetermined amount or less, the image formation is executed, so that the operator at a remote location can transmit the information irrespective of the toner remaining amount state of the image forming apparatus on the reception side.

According to the embodiment, when the toner remaining amount in the developing device decreases to a predetermined amount, in the case where the image signal other than the facsimile signal is inputted, the image formation is not executed. Therefore, not only the supply of the toner can be strongly promoted to the operator who is present near the device but also the entire amount of toner remaining in the developing device is used as toner for reception of the facsimile signal, so that a large amount of facsimile signals can be received until the toner is completely eliminated.

[Second embodiment]

In the second embodiment, the bias voltage which is applied to the developing agent holding member 16 which is executing the image formation is changed in accordance with the signal from the toner remaining amount detecting device 18. FIG. 4 shows a flowchart for the image forming operation also including a change in bias voltage in the embodiment. Characteristics portions in the embodiment will now be mainly explained. Processing steps which are common to those in the first embodiment are designated by the same reference numerals. First in step S1, when the signal which is sent from the toner remaining amount detecting device 18 to the CPU 6 is OFF, namely, in the case where the toner remaining amount in the developing device 13 exceeds the predetermined amount, step S2 follows. When the image signal is inputted, the processing routine advances to step S9 so as to immediately execute the image formation irrespective of the image signal inputted from any one of the devices such as telephone line 10, computer 9, and reader 2. In order to set an image density of the visualized image to an enough density, the developing bias voltage which is supplied to the developing agent holding member 16 is set to −600 V by the control signal from the CPU 6. The processing routine advances to step S3.

In step S1, when the signal which is sent from the toner remaining amount detecting device 18 to the CPU 6 is ON, namely, when the toner remain amount in the developing device 13 decreases to the predetermined amount or less, the processing routine advances to step S6 through steps S4 and S5. Only when the inputted image signal is the facsimile signal from the telephone line 10, in order to execute the image formation of the image signal, the developing bias voltage which is supplied to the developing agent holding member 16 is set to −450 V by the control signal from the CPU 6. The processing routine advances to step S7. Even when the developing bias voltage is set to −450 V, since a development contrast decreases, the image density slightly decreases. However, there is no information to be dropped.

According to the embodiment, in addition to the effects of the first embodiment, the image formation based on the reception signal of the facsimile which is executed after the toner remaining amount in the developing device was reduced to the predetermined amount is executed by decreasing a toner amount to be consumed by changing the developing bias voltage. Thus, there is an effect such that a larger amount of facsimile reception signals can be visualized until the toner is perfectly eliminated.

In the above example of the operation, the means for reducing the toner amount to be consumed when the image formation is executed is not limited to only the change in developing bias voltage. For example, a light amount of the laser beam 12, the uniform charging potential of the image holding member 20, or the like can be also changed. Even if the image is reduced and outputted, the consumption amount of the toner can be reduced. In the case of using an ink jet system as a visualizing device, it is sufficient to reduce an emission amount of the ink by changing the electric power which is supplied to a nozzle for emitting the ink.

[Third embodiment]

In this embodiment, a counter N to count the number of image forming times of the facsimile reception signal which was executed after the toner remaining amount detecting device 18 had detected that the toner remaining amount in the developing device 13 had decreased to the predetermined amount is provided on the memory means in the CPU 6. When a count value reaches a predetermined number of times, the facsimile reception is not executed. With this construction, it is possible to prevent that the visualized image of the reception signal of the facsimile is outputted as a blank paper.

FIG. 5 shows a flowchart for the image forming operation in the third embodiment. In the diagram, processing steps common to those in the first embodiment are designated by the same reference numerals. Characteristic portions in the embodiment will be mainly described. After the processing routine was started, first in step S0, the counter N is reset to 0 and step S1 follows. In the case where the facsimile signal is received in step S6, step S11 follows and a check is made to see if the count value N is less than 100. When N is less than 100, step S7 follows. If NO, step S8 follows. After completion of the execution of step S7, step S12 follows and the count value of the counter N is increased by "1" and the processing routine is returned to step S4. In the third embodiment, therefore, after the toner amount in the developing device 13 was reduced to the predetermined amount, the image formation based on the reception signal of the facsimile can be executed only 100 times. After that, the reception of the facsimile is inhibited. In step S8, a message indicating that the facsimile reception is inhibited due to the lack of the toner is informed to the device on the transmission side.

According to the embodiment, it is possible to prevent that the visualized image of the facsimile reception signal is outputted as a blank paper.

[Fourth embodiment]

In this embodiment, a first predetermined amount and a second predetermined amount are provided as reference values for the remaining amount of the toner which is detected by the toner remaining amount detecting means 18, in which there is a relation of (the first predetermined amount)>(the second predetermined amount). When the toner remain amount detecting means detects that the remain amount of the toner has reduced to the first predetermined amount, the image formation of only the reception signal of the facsimile is executed. When the toner remaining amount detecting means detects that the toner remaining amount has reduced to the second predetermined amount, the input of all of the image signals is inhibited. Thus, it is possible to prevent that the visualized image of the facsimile reception signal is outputted as a blank paper.

Figure 6:
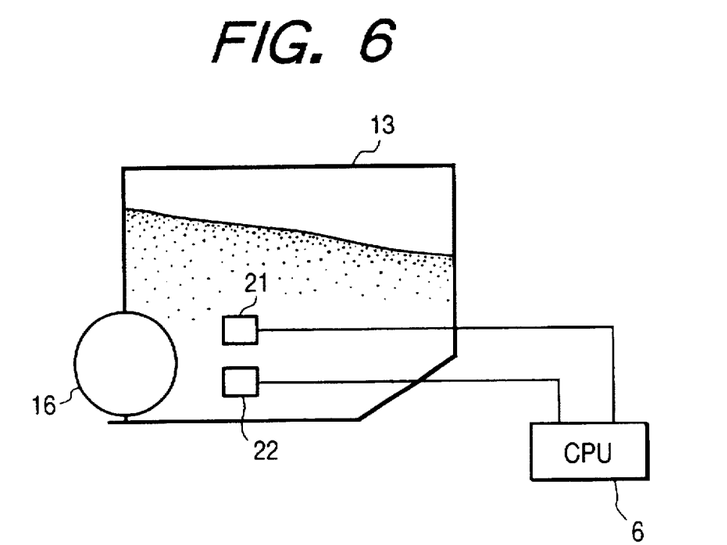
FIG. 6 is a schematic diagram of a developing device 13 in the fourth embodiment.

FIG. 6 shows a schematic diagram of the developing device 13 which can be applied to the fourth embodiment. A first toner remaining amount detecting device 21 can detect that the remaining amount of toner has been reduced to the first predetermined amount. A second toner remaining amount detecting device 22 can detect that the toner remaining amount has been reduced to the second predetermined amount. The first and second toner remaining detecting devices 21 and 22 can be constructed by piezoelectric devices or the like. A difference between the first and second predetermined amounts is set to a value such that about 500 standard originals can be visualized.

[Fifth embodiment]

The construction in which the image formation of only the facsimile reception signal is executed even if the toner remain amount in the developing device 13 decreased to the predetermined amount has been described in the above embodiments. However, the kind of image signal which permits the execution of the image formation even if the toner remain amount in the developing device 13 decreased to the predetermined amount, is not limited to the facsimile reception signal.

In the case where the computer 9 in the first embodiment is arranged at a remote location in a manner similar to the facsimile, the image formation of the image signal from the computer 9 is also executed after the signal of the toner remaining detection signal was turned on.

If the kind of device for executing the image formation even if the remain amount decreased to the predetermined amount can be preset by an operating unit (not shown) or the like of the image forming apparatus 1, the effect of the invention can be further enhanced.

The visualizing device of the invention is not limited to the electrophotographic system which uses the toner but even in case of the ink jet system using the ink or the like, a similar effect can be obtained.

In each of the above embodiments, in a device having a memory for substitution reception as in case of a paper absent state or the like, even if the toner is completely eliminated due to the visualization of the facsimile reception image after the toner remaining amount detection signal was turned on, the memory substitution reception can be continued until a vacant capacity of the memory is eliminated.

The present invention is not limited to the foregoing embodiments but many modifications and variations are possible within the spirit and scope of the appended claims of the invention.

What is claimed is:

1. An image forming apparatus comprising:
   input means for inputting image data from a first information generating source and a second information generating source;
   image forming means for forming an image by a visualizing agent on the basis of the image data which is inputted by said input means;
   detecting means for detecting a remaining amount of said visualizing agent; and
   control means for performing a stop operation to inhibit the image formation based on the image data from said first information generating source releasing the stop operation to allow the image formation based on the image data from said second information generating source when said detecting means detects that the remaining amount of said visualizing agent is equal to or less than the first predetermined amount, and performing the stop operation to inhibit the image formation based on the image data from said second information generating source when the remaining amount of said visualizing agent is equal to or less than a second predetermined amount less than the first predetermined amount.

2. An apparatus according to claim 1, wherein said first information generating source is an image reading device and said second information generating source is a facsimile receiving device.

3. An image forming apparatus having a copying or printing function and a facsimile receiving function, comprising:

first input means for inputting image data for a copy or print;

second input means for inputting image data for a facsimile reception;

image forming means for forming an image by a visualizing agent on the basis of the image data from said first input means and the image data from said second input means;

detecting means for detecting a remaining amount of said visualizing agent;

control means for performing a stop operation to inhibit an image formation based on the image data from said first input means and releasing the stop operation to perform the image formation based on the image data from said second input means when said detecting means detects that a remaining amount of said visualizing agent is equal to or less than a first predetermined amount, and performing the stop operation to inhibit the image formation based on the image data from said second input means when the remaining amount of said visualizing agent is equal to or less than a second predetermined amount less than the first predetermined amount; and display means for displaying a message to promote a supply of the visualizing agent when said detecting means detects that the remaining amount of said visualizing agent is equal to or less than the first predetermined amount.

4. An apparatus according to claim 3, wherein said visualizing agent is a toner.

5. An apparatus according to claim 3, wherein said visualizing agent is an ink.

6. An apparatus according to claim 3, wherein when said detecting means detects that the remaining amount of said visualizing agent is equal to or less than the first predetermined amount, said image forming means reduces a density at the time of the image formation based on the image data from said second input means.

7. An apparatus according to claim 3, wherein when said detecting means detects that the remaining amount of said visualizing agent is equal to or less than the first predetermined amount, said image forming means reduces a magnification at the time of the image formation based on the image data from said second input means.

8. An image forming apparatus having a copying or printing function and a facsimile receiving function, comprising:

first input means for inputting image data for a copy or print;

second input means for inputting image data for a facsimile reception;

image forming means for forming an image by a visualizing agent on the basis of the image data from said first input means and the image data from said second input means; and detecting means for detecting a remain amount of said visualizing agent, wherein said detecting means has a first reference value for detecting the absence of said visualizing agent in order to inhibit the image formation based on the image data from said first input means and a second reference value which is smaller than said first reference value and detects the absence of said visualizing agent id order to inhibit the image formation based on the image data from said second input means.

9. An apparatus according to claim 8, further having control means for inhibiting the image formation based on the image data from said first input means when said detecting means detects that the remain amount of said visualizing agent is equal to or less than said first reference value and for inhibiting the image formation based on the image data from said second input means when said detecting means detects that the remain amount of said visualizing agent is equal to or less than said second reference value.

10. An apparatus according to claim 8, further having display means for displaying a message to promote a supply of said visualizing agent when said detecting means detects that the remain amount of said visualizing agent is equal to or less than said first reference value.

11. An apparatus according to claim 8, wherein said visualizing agent is a toner.

12. An apparatus according to claim 8, wherein said visualizing agent is an ink.

13. A control method of an image forming apparatus having input means for inputting image data from a first information generating source and a second information generating source, comprising steps of:

detecting a remaining amount of a visualizing agent to perform an image formation on the basis of the image data from said input means; and performing a stop operation to inhibit the image formation based on the image data from said first information generating source when the remaining amount of said visualizing agent detected in said detecting step is equal to or less than a first predetermined amount, and sequentially performing the stop operation to inhibit the image formation based on the image data from said second information generating source when the remaining amount of said visualizing agent is equal to or less than a second predetermined amount less than the first predetermined amount.

14. An method according to claim 13, wherein said first information generating source is an image reading device and said second information generating source is a facsimile receiving device.

15. A control method of an image forming apparatus having first input means for inputting image data for a copy or print and second input means for inputting image data for a facsimile reception, comprising the steps of:

detecting a remaining amount of a visualizing agent to perform an image formation on the basis of the image data from said first input means and the image data from said second input means;

displaying a message to promote a supply of said visualizing agent when it is detected that the remaining amount of said visualizing agent is equal to or less than a predetermined amount;

inhibiting the image formation based on the image data from said first input means and performing the image formation based on the image data from said second input means when it is detected that the remaining amount of said visualizing agent is equal to or less than the predetermined amount; and inhibiting the image formation based on the image data from said second input means when the remaining amount of said visualizing agent is equal to or less than a second predetermined amount smaller than said predetermined amount.

16. A method according to claim 15, wherein said visualizing agent is a toner.

17. A method according to claim 15, wherein said visualizing agent is an ink.

* * * * *

UNITED STATES PATENT AND TRADEMARK OFFICE
CERTIFICATE OF CORRECTION

PATENT NO. : 5,790,918

DATED : August 4, 1998

INVENTOR : TSUYOSHI KUNISHI

It is certified that error appears in the above-identified patent and that said Letters Patent is hereby corrected as shown below:

On the title page

<u>COLUMN [73] ASSIGNMENT</u>,
"Japan" should read --Tokyo, Japan--.

<u>COLUMN 1</u>,
Line 42, "decreased" should read --is decreased--;
Line 45, "In case" should read --In the case--;
Line 50, in case" should read --In the case--;
Line 51, "lacks" should read --is lacking--;
Line 53, "person," should read --operator in attendance,--; and
Line 56, "lacks" should read --is lacking--.

<u>COLUMN 2</u>,
Line 43, "In case" should read --In the case--; and
Line 51, "stored" should read --stored,--.

<u>COLUMN 3</u>,
Line 47, "lit" should read --turned--.

UNITED STATES PATENT AND TRADEMARK OFFICE
CERTIFICATE OF CORRECTION

PATENT NO. : 5,790,918

DATED : August 4, 1998

INVENTOR : TSUYOSHI KUNISHI

It is certified that error appears in the above-identified patent and that said Letters Patent is hereby corrected as shown below:

COLUMN 4,
Line 6, "remain" should read --remaining--;
Line 30, "Characteristics" should read --Characteristic--;
Line 43, "an enough" should read --a sufficient--;
Line 49, "remain" should read --remaining--; and
Line 55, "voltage" should read --voltages--, and "is" should read --are--.

COLUMN 5,
Line 48, "informed" should read --communicated--;
Line 62, "remain" (first occurrence) should read --remaining--; and
Line 67, "reduced" should read --been reduced--.

COLUMN 6,
Line 20, "remain" should read --remaining--, and "decreased" should read --is decreased--;
Line 24, "remain" should read --remaining--, and "decreased" should read --is decreased--;
Line 34, "remain" should read --remaining--, and "decreased" should read --is decreased--;

UNITED STATES PATENT AND TRADEMARK OFFICE
CERTIFICATE OF CORRECTION

PATENT NO. : 5,790,918

DATED : August 4, 1998

INVENTOR : TSUYOSHI KUNISHI

It is certified that error appears in the above-identified patent and that said Letters Patent is hereby corrected as shown below:

COLUMN 6 (CONT.),
Line 39, "toner" should read --toner,--;
Line 40, "in case" should read --in the case--;
Line 43, "in case" should read --in the case--; and
Line 50, "embodiments" should read --embodiments,--.

COLUMN 8,
Line 7, "remain" should read --remaining--;
Line 15, "id" should read --in--;
Line 21, "remain" should read --remaining--;
Line 25, "remain" should read --remaining--; and
Line 31, "remain" should read --remaining--.

S5,
Figure 5, "REMAIN AMOUNT" SHOULD READ --REMAINING AMOUNT--.

Signed and Sealed this

Sixth Day of April, 1999

Attest:

Q. TODD DICKINSON

*Attesting Officer*   Acting Commissioner of Patents and Trademarks